United States Patent [19]
Peterson

[11] 3,825,296
[45] July 23, 1974

[54] ANTI-GLARE SYSTEM FOR MOTOR VEHICLES

[76] Inventor: Stuart R. Peterson, 790 Southgate Office Plaza, 5001 W. 78th St., Minnetonka, Minn. 55437

[22] Filed: Apr. 24, 1972

[21] Appl. No.: 246,858

[52] U.S. Cl................... 296/97 D, 16/147, 16/171, 296/97 K
[51] Int. Cl............................................ B60j 3/02
[58] Field of Search.... 296/97 R, 97 B, 97 C, 97 D, 296/97 F, 97 G, 97 H, 97 J, 97 K; 248/289; 16/147, 171

[56] References Cited
UNITED STATES PATENTS

| | | | |
|---|---|---|---|
| 2,057,009 | 10/1936 | Chadwick | 296/97 K |
| 2,153,095 | 4/1939 | McKinley | 296/97 K |
| 2,456,484 | 12/1948 | Bell | 296/97 K |
| 2,802,693 | 8/1957 | Lauve | 296/97 D |
| 3,008,177 | 11/1961 | Wooten | 16/147 |
| 3,244,447 | 4/1966 | Whitaker | 296/97 R |
| 3,405,969 | 10/1968 | Creel | 296/97 H |
| 3,463,435 | 8/1969 | McGrew | 296/97 R X |

FOREIGN PATENTS OR APPLICATIONS

| | | | |
|---|---|---|---|
| 1,264,533 | 5/1961 | France | 296/97 K |

Primary Examiner—Robert G. Sheridan
Assistant Examiner—Leslie J. Paperner

[57] ABSTRACT

A pair of glare shields have ball-shaped ends releasably engageable with several brackets attached at fixed locations adjacent the windshield of a motor vehicle. In one embodiment the brackets are formed with sockets and resilient members that releasably hold the ball-shaped ends. In a second embodiment the brackets are formed with sockets and magnetic members that releasably hold the ball-shaped ends. In both embodiments the driver or front seat passenger may elect to have both shields in a generally planar relation with the windshield, or a choice may be made as to whether either shield is in a planar relation with the windshield in front of the driver or in front of the passenger with the other shield angling rearwardly away from the windshield at the left of the driver, between the driver and passenger, or at the right of the passenger. In this way the two glare shields can be individually swung into a number of sun-obstructing positions, the user selecting an arrangement most effective for the particular light conditions then being encountered.

39 Claims, 9 Drawing Figures

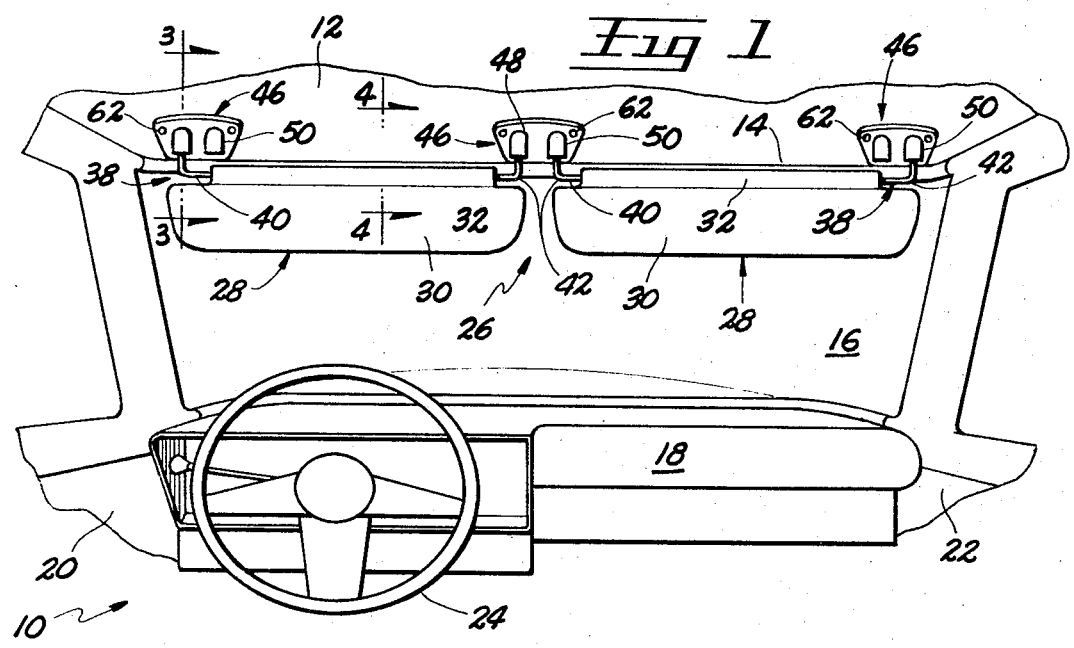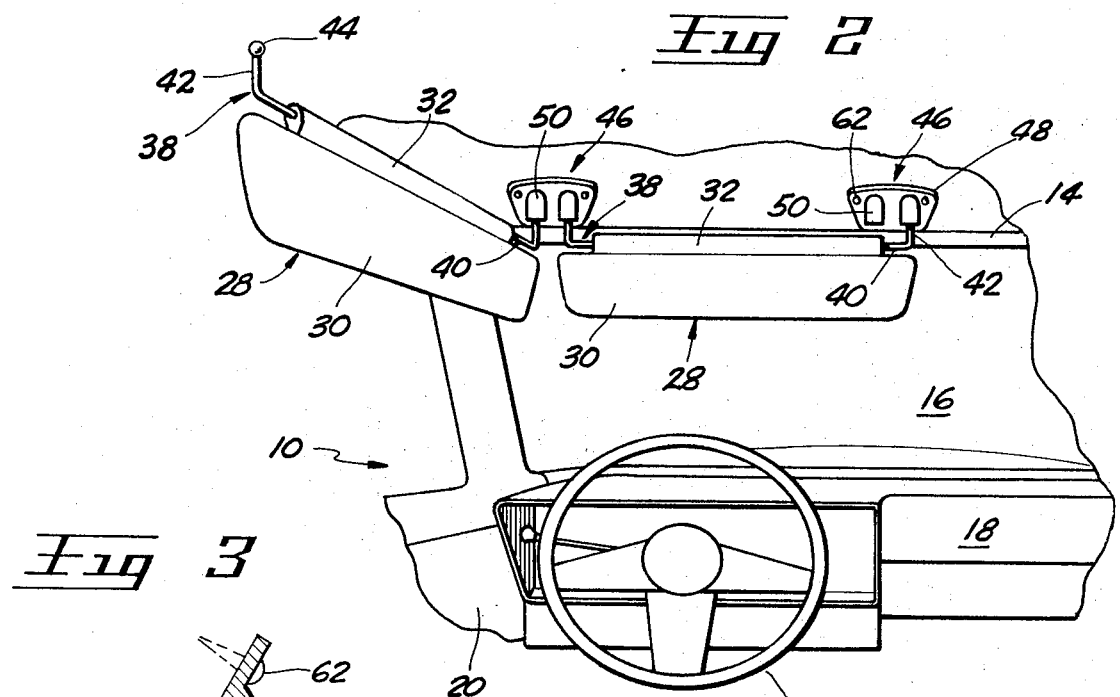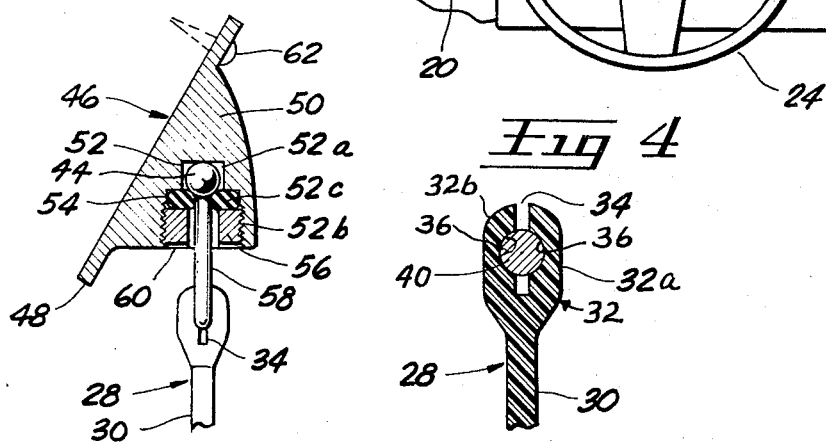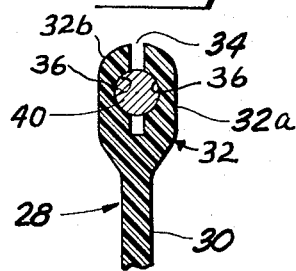

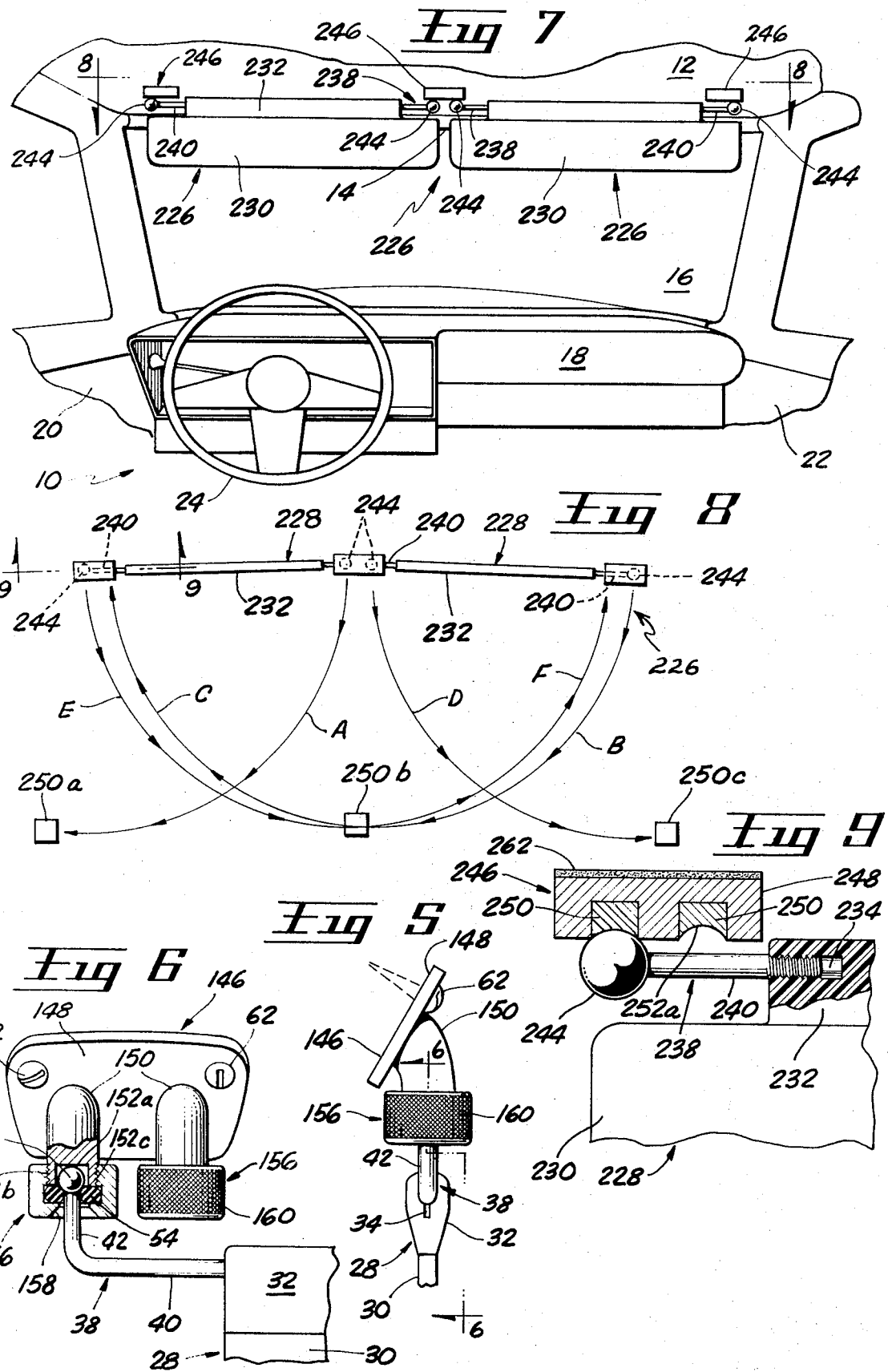

ANTI-GLARE SYSTEM FOR MOTOR VEHICLES

BACKGROUND OF THE INVENTION

1. Field of the Invention

This invention relates generally to glare shields or sun visors for motor vehicles, and pertains more particularly to an anti-glare system in which either of two panels, or both, may be individually moved into optimum angular positions.

2. Description of the Prior Art

A number of anti-glare systems have been devised in the past in an effort to minimize the danger and discomfort from the sun's rays entering the forward portion of a motor vehicle where they otherwise strike persons sitting in the front seat. Usually, the prior art systems have included a pair of glare shields or visor panels that may be swung in each instance about a single axis or pivot point from a position confronting the windshield to a position angling therefrom. The restricted number of positions into which these shields can be swung has frequently reduced their effectiveness for both the driver and front seat passenger, and under some circumstances has made them virtually useless for the passenger when protecting the driver and vice versa when protecting the passenger. One prior art attempt has favored the driver, but ignores the comfort of the passenger.

Consequently, further attempts have been made to provide added protection, these attempts concentrating mainly on the provision of auxiliary panels that can be extended from the main or base panel in order to more effectively block the entering rays of light. Not only are such extensions more costly, but they are frequently unsightly; furthermore, the additional weight can militate against the retention of such a combination of panels in a desired angular relationship, especially the retracted angular position that the panels assume when not being actually used in that the extra weight tends to pivot the combination downwardly into the driver's or passenger's line of vision.

SUMMARY OF THE INVENTION

One object of the present invention is to provide an anti-glare system which will be more versatile and effective than heretofore. In this regard, an aim of the invention is to utilize only two glare shields or visor panels, mounting them so that each may be swung into a greater number of useful angular positions. More specifically, it is within the purview of the invention to make available to either, or both, the driver and front seat passenger a greater number of angular positions of the two glare shields so that, depending upon the direction in which the sun's rays are entering the vehicle, the shields can be easily and quickly manipulated to best provide an optimum blocking of the rays that would prove objectionable to anyone occupying either side of the front seat.

Another object of the invention is to provide a glare shield system that will be simple, easy to adjust, and relatively inexpensive to manufacture and install.

A further object is to provide an anti-glare system for motor vehicles that will be attractive, actually not noticeably different in appearance from present visor arrangements.

Still further, an object is to provide a system of the foregoing character in which both of the glare shields or visor panels will remain, or can be made to remain, in their selected positions until intentionally moved to a different position. Although the invention lends itself readily for at all times releasably supporting both ends of each glare shield, it is planned that both shields will be so supported when confronting the windshield which will be the normal and most used relationship.

Another object is to provide a system for effectively shielding front seat occupants from the sun in which the individual shades or visor panels can be easily tilted downwardly from their retracted or stored positions into their useful or operative positions, this being possible irrespective of their relationship of either visor relative the windshield.

Yet another object of the invention is to provide an anti-glare system for motor vehicles that will be safe in that the mounting hardware will be relatively flush with the interior of the vehicle and therefore not vulnerable, or at least not abnormally so, to being struck by an occupant in case of an accident.

Briefly, my invention contemplates the employment of two glare shields or visor panels that are releasably held at opposite ends so that either end may be easily and quickly detached, thereby enabling the user to swing the detached end through an arc so as to orient or position the particular shield in a position that renders it most effective as far as obstructing the sun's rays. More specifically, each end of each shield or panel is provided with a ball-shaped end which engages a socket member. In one instance, the ball end is retained in the socket by reason of a resilient O-ring which permits the ball end to be removed from the socket when the shield is to be pivoted or swung about its other end. In the second embodiment, the socket is equipped with a small magnet that enables the release to be realized. Consequently, the shields or panels can be positioned in a planar or confronting relation with the windshield, which is the relation most frequently needed, or one panel can be swung to one side of the vehicle with the other panel then being swung into a planar relationship with the windshield so as to occupy the same light-shielding position previously assumed by the first one. Either the driver or the front seat passenger is provided with a choice and he can select the shield or panel relationship proving to be the most effective for the particular sun conditions that exist at any given time, such conditions depending upon the direction of road travel in relation to the location of the sun at that particular time.

BRIEF DESCRIPTION OF THE DRAWINGS

FIG. 1 is a fragmentary perspective view of the forward portion of a motor vehicle with both of the glare shields of my system in a confronting or operative relation with the windshield;

FIG. 2 is a perspective view of the left forward portion of the vehicle with the two shields oriented so as to afford the greatest protection to the driver when the sun is coming from the front or left;

FIG. 3 is a sectional view taken in the direction of line 3—3 in FIG. 1 for the purpose of showing the manner in which one ball end is releasably retained in the socket portion of a member fixedly attached to the vehicle's roof;

FIG. 4 is a sectional view taken in the direction of line 4—4 for the purpose of illustrating how a plastic shield or panel is mounted on its U-shaped arm or rod;

FIG. 5 is a side elevational view corresponding generally to FIG. 3 but illustrating a slightly modified arrangement for releasably retaining the ball-shaped end within the socket portion of a fixed member;

FIG. 6 is a sectional view taken in the direction of line 6—6 of FIG. 5;

FIG. 7 is a perspective view corresponding to FIG. 1 but illustrating a second embodiment utilizing a magnetic form of retention for the ball ends;

FIG. 8 is a top plan view of the anti-glare system appearing in FIG. 7, various arcuate paths through which the two shields or panels can be swung having been denoted by a plurality of arrows, and FIG. 9 is a sectional view taken in the direction of line 9—9 of FIG. 8 for the purpose of showing the cross sectional make-up of one of the brackets containing magnetic socket members.

DESCRIPTION OF THE PREFERRED EMBODIMENTS

Referring now in detail to the basic embodiment illustrated in FIGS. 1 and 2, and the particular manner in which one ball-shaped end is releasably held as specifically shown in the sectional detail of FIG. 3, it will be observed that the vehicle body, although only fragmentarily pictured, has been designated generally by the reference numeral 10. That portion of the vehicle body 10 which is of concern in describing the invention includes a roof panel 12, a header 14, a windshield 16, a dashboard 18, side doors 20, 22 (each having a side window therein) and a steering wheel 24. Obviously, these are conventional parts which can be found in virtually any automobile now being manufactured and sold. Reference to these parts, however, provides a basis for a full understanding of my invention now to be presented.

Accordingly, the visor or anti-glare system illustrated in FIG. 1, and also to a degree in FIG. 2, has been assigned the reference numeral 26. The system 26 comprises a pair of glare shields 28, each constituting a panel 30 formed with a rib 32 extending along its upper edge. The rib 32, as can be discerned from FIG. 4, is formed with a slot 34 having outwardly curved inner wall portions at 36. It is contemplated that the material constituting the panels 30 will be of a suitable plastic, such as polyethylene or vinyl. Such a plastic not only results in the provision of a lightweight panel but also enables the entrance portion of the slot 34 to be expanded or flexed wider in that the side portions of the rib 32 constitute gripping fingers or flanges 32a, 32b that are somewhat resilient. The advantage of this will become clearer in the ensuing paragraph.

A U-shaped arm in the form of a rod or shaft 38 is employed for pivotally or hingedly mounting each panel 30. As far as the system 26 is concerned, the arm or shaft 38 may be of either metal or plastic. The arm 38 includes a straight shank 40 to which the panel 30 is pivotally attached. More specifically, the slot 34 permits the sides 32a, 32b of the rib 32 to be sprung apart, as already alluded to, so as to permit entry of the shank 40 into the position depicted in FIG. 4. Owing to the inherent resiliency of the rib 32, more specifically the side sections 32a, 32b formed by the slot 34, it follows that the panel 30 is hingedly supported on the shank 40 for pivotal movement from the downwardly extending or operative position illustrated in FIG. 1 into a retracted or inoperative position when the particular shield 28 is not needed. This general type of tilting movement, that is from a downwardly extending position in which the sun's rays are obstructed into an upper or out of the way position and vice versa is conventional. However, the specific manner in which this hinge action is achieved is believed to be unique and contributes to the practical value of the instant invention. Stated somewhat differently, the benefits of the prior art are retained as far as this feature is concerned, but additional benefits are realized as will now be explained.

Therefore, continuing with the description of the U-shaped arm 38, it will be noted that there is a right angle end section 42 that is integral with the ends of the shank 40. Actually, the shank 40 plus the two end sections 42, which extend perpendicularly thereto, provide the U-shaped configuration of the complete arm 38. Each end section 42 is equipped with a ball-shaped end 44. Thus, the U-shaped arm 38 in each instance includes the shank 40, the two end sections 42 and the ball 44 integrally carried on each end section. As the description progresses, it will be seen that each ball 44 functions as a connective member which is releasably engaged with a complementally shaped socket member.

As can readily be seen in FIG. 1, there are three brackets 46. Each has a base 48 and a pair of adjacent integral barrel members 50 thereon. Each barrel member 50 contains a socket or counterbored passage 52. From FIG. 3 it will be perceived that the socket or passage 52 is composed of a socket portion 52a for receiving one ball-shaped end 44, an internally threaded entrance portion 52b, and a shoulder 52c. The threaded portion 52b receives therein a resilient O-ring 54, this O-ring being of an elastomeric or compressible material such as Silicone rubber or neoprene. The upper side of the O-ring 54 bears against the shoulder 52c. Maintaining a captive condition of the O-ring is an annular compression nut 56 having a bore 58 of a size to permit movement of the ball-shaped end 44. A screwdriver slot 60 extends diametrically across the lower side of the compression nut 56 and permits the compression nut 56 to be tightened or advanced against the O-ring 54.

It can be explained at this time that the opening in the O-ring 54 can initially be somewhat less in diameter than the diameter of the ball end 44. The specific size of the opening, or even the outer diameter of the O-ring 54, is not critical; all that is required is that the nut 56 be capable of compressing the O-ring 54 to such a degree that the opening therethrough is reduced sufficiently so that it becomes less than that of the diameter for the ball 44. It is not intended that the opening be reduced to such an extent that the ball 44 will not pass downwardly therethrough; it is just that the opening should be sufficiently less so that the ball 44 is held or retained in a captive state within the socket portion 52a, yet capable of being manually pulled downwardly to effect its release. It is believed readily apparent that the nut 56, owing to its position in the threaded entrance portion 52b, will compress the O-ring 54 enough to produce the retentive relationship. When the ball 44 is pulled downwardly, then the O-ring 54 compresses further as the inner diameter is cammed or squeezed outwardly by the ball 44 to permit the release of the ball. The same action occurs when the ball 44 is reinserted through the bore of the compression nut 56, the O-ring 54 then yielding so as to permit the movement of the ball 44 into said socket portion 52a.

Consequently, it is thought obvious that each barrel member 50 functions as a second connective member. It will be additionally appreciated that any ball 44 and barrel 50 serves as a swivel means or unit when the ball and barrel members are engaged. In other words, any ball 44 is free to swivel or pivot about an axis provided by the particular barrel member 50, more specifically its socket 52.

Although the ends 44 (one in FIG. 2 and one in FIG. 3) have been illustrated as spherical balls, it will be appreciated that these elements may be elongated with rounded upper and lower ends and a cylindrical portion therebetween. In such a case, the socket portion 52a would be longer and would possess a fairly close fit with the intermediate cylindrical portion, thereby reducing any tendency for the modified "ball" to rock within the socket portion 52a. Likewise, the ball 44 can be formed with a small cylindrical tip that would extend upwardly into a recess formed in the barrel member 50 just above the socket portion 52a. For the most part, the O-ring 54 will exert a sufficient restraint against any rocking which would be most apt to take place when tilting the panel 30 about the longitudinal axis provided by the shank 40, that is, when tilting or pivoting the panel clockwise or counterclockwise as viewed in FIG. 4. At any rate, the term "ball" is herein used in a sense sufficiently broad to embrace elongated members with rounded ends.

While the brackets 46 can be fixedly attached to the underside of the roof panel 12 by a variety of means, screws 62 have been illustrated. A pair of such screws 62 are used to mount each bracket 46, the screws simply passing through holes in the base 48 in performing their anchoring role.

As will be understood, a screwdriver, coin or other implement is needed in order to change the degree of compression of the O-ring 54 as far as FIG. 3 is concerned. To permit a greater ease of change as far as the compression is concerned, the modification appearing in FIGS. 5 and 6 is more advantageous. Due to the similarity between what is shown in FIG. 3 and what is shown in FIGS. 5 and 6, a "1" has been added before each reference numeral. Hence, the bracket has been given the reference number 146, having a base 148 and a pair of barrel members 150. Each barrel member 150 has a socket portion 152a and an externally threaded portion 152b. Corresponding generally to the shoulder 52c of FIG. 3 is the end 152c in FIG. 6.

A cup-shaped compression nut 156 contains internal threads which are engageable with the external threads 152b. To facilitate entry of the ball-shaped end 44, the compression nut 156 has a tapered entranceway 158. By means of knurling 160, the compression nut 156 can be grasped with one's fingers and advanced upwardly to compress the O-ring 54. In other words, the knurled exterior 160 is a substitution for the screwdriver slot 60 shown in FIG. 3. Therefore, considerably more latitude and freedom of adjustment is afforded as far as the modification of FIGS. 5 and 6 is concerned in contradistinction to the arrangement illustrated in FIG. 3; the action or result, however, is virtually the same in that the internal diameter of the O-ring 54 is decreased in both situations.

As far as FIGS. 1–6 are concerned, they represent basically one embodiment. The difference resides in the manner in which the ball and socket retention is achieved; as explained with respect to FIGS. 3, 5 and 6, such a mechanical difference does not alter the complexion of the overall system that has been labeled 26.

The system now to be described in conjunction with FIGS. 7, 8 and 9 is sufficiently different so as to warrant the use of a different reference numeral arrangement. On the other hand, there are certain similarities pervading the two systems and to afford a facile comparison the reference numerals carry a prefix "2". More specifically, the embodiment now to be described has been denoted generally by the reference numeral 226. The glare shields have been given the reference numeral 228 and while the panel 230 could be identical with the panel 30 of the previously described system 26, especially if the U-shaped arm 38 is of metal rather than plastic. Still, the present system 226 lends itself to certain changes. Notable amongst such possible changes is that the rib 232 at the upper edge of the panel 230 contains a tapped or threaded hole 234, the slot 34 not being employed as far as this embodiment is concerned, although the slotted form of pivotal mounting can be employed, as will become apparent as the description proceeds. Whereas the arm 38 is U-shaped, the modified version now being described includes a pair of straight arms, rods or shafts 238 having a shank 240 in each instance which is threadedly received in the tapped hole 234. Integral with the free end of the shank 240 is ball-shaped end 244.

As with the system 26, the system 226 includes a trio of brackets 246, each having a base 248 containing a pair of permanent magnet members 250, each having a socket portion 252a, like that illustrated in U.S. Pat. No. 2,561,923 granted July 24, 1951 for "FOUNTAIN PEN DESK SET." Thus, the magnetically attractable ball 244 being a paramagnetic material, such as iron, steel or nickel, constitutes one connective member and the magnet 250 a cooperable connective member. Hence, as with the system 26 where any ball 44 and barrel 50 serves as a swivel means when the ball is received in the socket portion 52a or 152a, a swivel means or unit is provided with any ball 244 and any socket portion 252a of a magnet.

While screws corresponding to the screws 62 could be used for attaching the bases of 248 as far as the system 226 is concerned, FIG. 9 shows a strip of pressure sensitive tape 262, the tape being double-coated. Conversely, the adhesive tape 262 could be used in the system 26 rather than the screws 62.

As will be perceived from FIG. 8, it is desirable when using the system 226 to employ three additional magnet members 250a, 250b and 250c. Consequently, when the shield 228 at the left is swung so that its ball end 244 reaches the magnet member 250a, the ball 244 will be releasably retained with the shield 228 extending along the left side of the vehicle. This corresponds to the position of the shield 28 at the left in FIG. 2. If the second shield 228 is needed directly in front of the driver, then the shield 228 appearing at the right in FIGS. 7 and 8 is swung so that it assumes for all intents and purposes the position of the shield shown at the left in these two figures.

It may be of assistance in realizing what is accomplished to point out that the ball 244 on the right end of the left shield 228 is detached from the socket of the magnet 250 at the left on the central bracket 246, then moved through the arcuate path denoted by the sequence of arrows A. Next, the right-hand shield 228 is swung so that the ball 244 at the extreme right in FIGS. 7 and 8 first traverses an arcuate path indicated by the sequence of arrows B, continuing through the arc labeled C. This manipulation will swing the shield 228 into the same position as the shield 28 at the right in FIG. 2. The positioning of the shields 228 as just described protects the driver from the sun's rays coming from directly in front, from the left and angles therebetween.

On the other hand, if the passenger in the front seat is desirous of procuring the same degree of protection as described above for the driver, then the right-hand shield 228 in FIGS. 7 and 8 is swung so that its left ball 244 traverses the arcuate path indicated by the arrows D. In other words, the ball 244 at the left would be moved so that it engages the magnet 250c. The shield 228 at the left, more specifically the ball 244 on its left end, would be swung so that it follows the arcuate path labeled E, continuing past the magnet 250b and following the path F. This causes the shield 228 at the left in FIGS. 7 and 8 to assume the position of the shield 228 at the right, the right-hand shield 228 under this set of circumstances having been swung to the right and thus extending along the door 22 to the right of the passenger.

Additional choices exist with respect to the angular positioning of either shield 228 in the system 226, this being so that one shield has its ball 244, this being the ball on the right end of the right shield 228, moved through only the arc B or the ball 244 on the left end of the left shield in these figures moved through only the path E. Thus, the sunlight should be coming through the right-hand portion of the windshield 16 and at an angle so as to make it desirable to swing the shield 228 at the right in FIGS. 7 and 8 into a position so that its right end ball 244 engages the magnet 250b, then the shield 228 at the left would remain as shown. With the shield 228 extending between the central bracket 246 and the magnet 250b, then the driver is protected from light coming directly from in front or at an angle from the right. This is the arc B manipulation referred to in this paragraph. Similarly, if the passenger in the front seat is desirous of receiving similar protection from light coming from directly in front or at an angle to the left portion of the windshield 16, then the shield 228 at the left is swung so that its left ball end 244 engages the magnet 250b. This is the path E situation mentioned in this paragraph.

Whereas the angular adjustments that are possible with the shields 228 of the system 226 have been described, it will be recognized that the same angular movements are possible with the shields 28 of the system 26. There is one difference, however, and that is that normally additional brackets 46 at the locations occupied by the magnets 250a, 250b and 250c are not required in the system 26. Brackets having appropriately shaped sockets can be mounted to the roof 12 at these locations but due to the fact that the end sections 42 extend perpendicularly from the longitudinal axis of the shank 40, provides a vertical axis that is sufficiently rigid, particularly if the ends 44 are elongated, so as to hold the shield 28 along either the door 20 or the door 22 or centrally between the driver and front seat passenger.

One fundamental or basic dissimilarity between the system 26 and the system 226 lies in the fact that the ball 44 need not be metallic as far as the U-shaped arms 38 are concerned. It has already been pointed out that these U-shaped members 38 can be of plastic material and the balls 44, being an integral part of the arm in each instance can be of plastic. This is of some advantage in that the shield 28 can be fabricated somewhat less expensively than the shield 228.

Another difference, which can be a manufacturing advantage, is that the sockets 252a in the magnets 250 permit a swivel movement of the ball 244 relative thereto without having to pivotally or hingedly mount the panel 230 on a horizontal shank of any length, such as the shank 40 in the system 26. Where an extremely flush hardware mounting is desirable, the system 226 can be of especial utility.

The degree of releasable retention as far as the system 226 is concerned depends mainly on the strength of the magnets 250. As far as the degree of retention in the system 26 is concerned, this can be readily varied by the user, adjustment of the appropriate compression nut 60 or 160 influencing the holding action of its particular ball 44 within the associated socket portion 52a. In other words, the holding action is susceptible to adjustment by compressing the O-ring 54 to a greater degree, thereby making it more difficult to extract the ball 44 through its central opening.

From the foregoing, it is believed obvious that as far as the system 26 is concerned, the central bracket 46 is first attached by the screws 62 to the roof panel 12 and then the left bracket 46 attached so that the spacing of the barrel member 50 at the left on the left bracket 46 corresponds to the distance between the balls 44. The bracket 46 at the right is similarly fastened to the roof 12. With the spacing between the two barrel members 50 of each bracket 46 being the same, since it is intended that the brackets 46 be identically fabricated, it follows that the spacing between the barrel member 50 at the right on the left bracket 46 and the barrel member 50 at the right on the central bracket 46 will equal that of the balls 44, thereby permitting the connection appearing in FIG. 2 to be realized.

By the same token, the installer will affix the central bracket 246 of the system 226 and then the left and right brackets 246 so that the magnets 250 will be spaced properly for the accommodation of the balls 244. Additionally, though, the magnets 250a, 250b, 250c will each be located so that they are spaced from the various magnets 250 adjacent the windshield 16 an amount corresponding to the distance between balls 244.

In the case of system 26, it will be recognized that each glare shield 28 can be tilted or pivoted on its shank 40 without regard to the position of either shield in relation to the windshield 26. In other words, the shields 26 can be pivoted upwardly from an operative position into an inoperative or out-of-the-way position against the roof 12 even though the particular shield 26 may be extending angularly rearwardly from the windshield 16, such as along one side door 20 or 22, or centrally between the driver and passenger.

As far as the system 226 is concerned, the same result can be achieved, the magnets 250 (or 250a, 250b, 250c) permitting the balls 244 to be rotated in the sockets 252a. In other words, the magnetic type of ball and socket utilized in the system 226 provides a universal type of pivoting or swiveling. In the system 26, the universal action is obtained via the ball and socket construction plus the resilient mounting depicted best in FIG. 4.

I claim:

1. In a vehicle having a windshield and a body portion extending peripherally thereof, a glare shield, first means including a first connective member attached to said body portion at one location adjacent said windshield and a second connective member at one end of said glare shield, said first and second members being releasably engageable with each other and providing a first axis about which said glare shield may be pivoted, and second means including a third connective member attached to said body portion at a second location with respect to said windshield and a fourth connective member at the other end of said glare shield, said third and fourth members being releasably engageable with each other and providing a second axis about which said glare shield may be pivoted, whereby said fourth member may be detached from said third member to permit said glare shield to be swung about the first axis provided by said first means into a first angular position relative said windshield or said second member may be detached from said first member to permit said glare shield to be swung about the second axis provided by said second means into a second angular position relative said windshield.

2. The combination set forth in claim 1 in which said first and second means constitute respective ball and socket joints.

3. The combination set forth in claim 1 in which said second and fourth connective members are at least partially convex and said first and third connective members are at least partially concave.

4. The combination set forth in claim 3 in which said glare shield is provided with oppositely projecting shank portions at each end, said second connective member being disposed at the projecting end of one of said shank portions and the fourth connective member being disposed at the projecting end of the other shank portion.

5. The combination set forth in claim 4 in which said shank portions are portions of a shank extending through said glare shield so that said glare shield can be tilted on an axis provided by said shank.

6. The combination set forth in claim 5 in which said glare shield includes a panel having a rib disposed along one edge thereof, formed with a slot therein, said shank being received in said slot to permit tilting of said shield.

7. The combination set forth in claim 6 in which said slotted rib is formed with outwardly curving inner wall surfaces resiliently gripping said shank.

8. The combination set forth in claim 4 in which said shank portions are threadedly attached to said glare shield.

9. The combination set forth in claim 8 in which said glare shield includes a plastic panel having a rib disposed along one edge thereof, said threaded shank portions projecting from said rib.

10. The combination set forth in claim 9 in which said second and fourth members are paramagnetic balls and said first and third members are permanent magnets for releasably engaging said paramagnetic balls.

11. The combination set forth in claim 1 including a second glare shield, third means including a fifth connective member attached to said body portion at a third location adjacent said windshield and a sixth connective member at one end of said second glare shield, said fifth and sixth members being releasably engageable with each other and providing a third axis about which said second glare shield may be pivoted, and fourth means including a seventh connective member attached to said body portion at a fourth location adjacent said windshield and an eighth connective member at the other end of said second glare shield, said seventh and eighth members being releasably engageable with each other and providing a fourth axis about which said second glare shield may be pivoted, whereby said sixth member may be detached from said fifth member to permit said second glare shield to be swung about the fourth axis provided by said fourth means into a first angular position relative said windshield or said eighth member may be detached from said seventh member to permit said second glare shield to be swung about the third axis provided by said third means into a second angular position relative said windshield.

12. The combination set forth in claim 11 in which said first means includes a member engageable with said eighth connective member to assist in the support of said second glare shield when said first glare shield is in its said first angular position and said second glare shield has been swung about said third axis into a generally planar relation with said windshield, said eighth connective member then being adjacent said first connective member.

13. The combination set forth in claim 12 in which said fourth means includes a member engageable with said second connective member to assist in the support of said first glare shield when said second glare shield is in its said first angular position and said first glare shield has been swung about said second axis into a generally planar relation with said windshield, said second member then being adjacent said seventh connective member.

14. The combination set forth in claim 11 including a ninth connective member attached to said body portion adjacent said first connective member on the side thereof nearer said third connective member for releasably engaging said eighth connective member to retain said second glare shield in a generally planar relationship with said windshield when said first glare shield is in its said first angular position, and a tenth connective member attached to said body portion adjacent said seventh connective member on the side thereof nearer said fifth connective member for releasably engaging said second connective member to retain said first glare shield in a generally planar relationship with said windshield when said second glare shield is in its said first angular position.

15. The combination set forth in claim 14 in which said first and ninth members constitute a first unit attached to said body portion adjacent the upper left-hand portion of said windshield, in which said third and fifth members constitute a second unit attached to said body portion adjacent the upper central portion of said windshield, and in which said seventh and tenth members constitute a third unit attached to said body portion adjacent the upper right-hand portion of said windshield.

16. The combination set forth in claim 15 including an eleventh connective member attached to said body portion at a location spaced rearwardly from said windshield along the left side of said vehicle for releasably engaging said fourth connective member when said first glare shield is in its said first angular position, said first glare shield then angling rearwardly in the direction of said eleventh member, and a twelfth connective member attached to said body portion at a location spaced rearwardly from said windshield along the right side of said vehicle for releasably engaging said sixth connective member when said second glare shield is in its said first angular position, said second glare shield then angling rearwardly in the direction of said twelfth member.

17. The combination set forth in claim 16 including a thirteenth connective member attached to said body portion at a location spaced rearwardly from said windshield centrally of said vehicle for releasably engaging said second connective member when said first glare shield is in its said second angular position, said first glare shield then angling rearwardly in the direction of said thirteenth member for releasably engaging said eighth connective member when said second glare shield is in its said second angular position, said second glare shield then angling rearwardly in the direction of said thirteenth member.

18. The combination set forth in claim 11 in which said third and fifth connective members are adjacent each other.

19. The combination set forth in claim 18 including a ninth connective member adjacent said first connective member to permit said eighth connective member to be releasably engaged with said ninth connective member and a tenth connective member adjacent said seventh connective member to permit said second connective member to be releasably engaged with said tenth connective member.

20. The combination set forth in claim 19 in which said first and fourth means each includes a base, said first and ninth connective members being mounted on the base of said first means, and said seventh and tenth connective members being mounted on the base of said fourth means.

21. The combination set forth in claim 20 in which said second and third means includes a common base, said third and fifth connective members being mounted on said common base.

22. The combination set forth in claim 21 in which the base of said first means is attached to said body portion adjacent the upper left-hand corner of said windshield, in which the base of said fourth means is attached to said body portion adjacent the upper right-hand corner of said windshield, and said common base is attached to said body portion adjacent the upper central portion of said windshield, the combination additionally including an eleventh connective member attached to the left side of said body portion at a location spaced rearwardly from said windshield for releasably engaging said fourth connective member when said first glare shield is in its said first angular position, and a twelfth connective member attached to the right side of said body portion at a location spaced rearwardly from said windshield for releasably engaging said sixth connective member when said second glare shield is in its said first angular position.

23. The combination set forth in claim 22 including a thirteenth connective member attached centrally to said body portion at a location spaced rearwardly from said windshield for releasably engaging said first connective member when said first glare shield is in its said second angular position or for releasably engaging said eighth connective member when said second glare shield is in its said second angular position.

24. The combination set forth in claim 11 in which said first, third, fifth and seventh connective members provide sockets and said second, fourth, sixth and eighth connective members form balls receivable in said sockets.

25. The combination set forth in claim 24 in which each member containing a socket is magnetic and said balls are paramagnetic.

26. The combination set forth in claim 25 including three additional magnetic socket members located in a rearwardly spaced relation with said windshield, two of said additional members being attached to the sides of said body portion and the third of said additional members being attached to the center of said body portion.

27. The combination set forth in claim 24 including a resilient O-ring in each socket of a size to permit said balls to pass therethrough.

28. The combination set forth in claim 27 in which each O-ring has an internal diameter less than that of the ball receivable therein.

29. The combination set forth in claim 27 including respective means for compressing each O-ring to vary the size of its said internal diameter.

30. The combination set forth in claim 29 in which each compressing means includes a compression nut threadedly attached to its said connective member.

31. In a vehicle having a windshield and body means extending peripherally thereof, a glare shield having shank means projecting from opposite ends thereof, first ball means on one projecting end of said shank means, second ball means on the other projecting end of said shank means, first socket means attached to said body means at a first location adjacent said windshield for releasably receiving therein at least a portion of said first ball means, second socket means attached to said body portion at a second location adjacent said windshield for releasably receiving therein at least a portion of said second ball means, said first and second socket means facing in the same general direction and being located at substantially the same elevation with respect to said windshield so as to maintain said glare shield substantially horizontal when said first ball means is received in said first socket means and said second ball means is received in said socket means, means for maintaining said glare shield substantially horizontal when said first ball means is released from said first socket means and said glare shield has been positioned at an angle to said windshield, and additional means for maintaining said glare shield substantially horizontal when said second ball means is released from said second socket means and said glare shield has been positioned at a different angle to said windshield.

32. The combination set forth in claim 31 in which each socket means includes a magnet for releasably retaining one of said ball means therein.

33. In a vehicle having a windhsield and body means extending peripherally thereof, first and second elongated visor panels, each panel having oppositely extending shank portions, a ball member carried at the free end of each shank portion, a first socket member attached to said body means adjacent the upper left-hand corner of said windshield, a second socket member attached to said body means above a central portion of said windshield and spaced from said first socket member a distance corresponding to the distance between the ball members on said first visor panel, a third socket member attached to said body means adjacent said second socket member and slightly to the right thereof, a fourth socket member attached to said body means adjacent the upper right-hand corner of said windshield, said third and fourth socket members being spaced apart a distance corresponding to the distance between the ball members on said first and second visor panels, the ball member on said first visor panel being received in said first and second socket members and the ball members on said second visor panel being received in said third and fourth socket members, whereby when the ball member recived in said second socket member is detached therefrom and said first visor panel is swung into a rearwardly directed position along the left side of the vehicle the ball member on said second visor panel which is received in said fourth socket member can be detached therefrom and said second visor panel swung through approximately 180° so that it assumes a second generally planar relationship with said windshield, or when the ball members on said first visor panel remain in said first and second socket members and the ball member on said second visor panel which is received in said fourth socket member is detached therefrom so said second visor panel can be swung into a centrally located position so that it assumes a generally perpendicular relationship with said windshield, or when the ball member on said second visor panel which is received in said third socket member is detached therefrom and said second visor panel is swung into a rearwardly directed position along the right side of the vehicle, the ball member on said first visor panel which is received in the first socket member can be detached therefrom and said first visor panel swung through approximately 180° so that it assumes a second generally planar relation with said windshield, or when the ball members on second visor panel remain in said third and fourth socket members and the ball member on said first visor panel which is received in said first socket member is detached therefrom said visor panel can be swung into a centrally located position so that it assumes a generally perpendicular relationship with said windshield.

34. The combination set forth in claim 33 in which said shank portions are portions of a single shank in each instance, said first panel being pivotally supported on one shank and said second panel being pivotally supported on the other shank.

35. The combination set forth in claim 34 in which said shanks have right angled end sections, said ball members being integrally attached to the ends of said right angled sections.

36. The combination set forth in claim 35 in which each socket member is tubular and vertically oriented with the entrance to its socket facing downwardly, and said end sections extend upwardly to provide swivel means permitting each panel to be swung about selected vertical axes provided by said swivel means.

37. The combination set forth in claim 36 including a resilient O-ring in each socket member for releasably retaining a ball member therein with a portion of each end section projecting downwardly through its particular O-ring, and an annular compression nut on each socket member for varying the internal diameter of said O-ring in relation to the diameter of the ball member retained therein.

38. In a vehicle having a windshield and body means extending peripherally thereof, first and second elongated visor panels, each panel having oppositely extending shank portions, a ball member carried at the free end of each shank portion, a first socket member attached to said body means adjacent the upper left-hand corner of said windshield, a second socket member attached to said body means above a central portion of said windshield and spaced from said first socket member a distance corresponding to the distance between the ball members on said first visor panel, a third socket member attached to said body means adjacent said second socket member and slightly to the right thereof, a fourth socket member attached to said body means adjacent the upper right-hand corner of said windshield, said third and fourth socket members being spaced apart a distance corresponding to the distance between the ball members on said first and second visor panels, the ball members on said first visor panel being received in said first and second socket members and the ball members on said second visor panel being received in said third and fourth socket members, a fifth socket member attached to said body means adjacent said first socket member and spaced from said third socket member a distance equal to the distance between the ball members on said second visor panel, a sixth socket member attached to said body means adjacent said fourth socket member and spaced from said second socket member a distance equal to the distance between the ball members on said first visor panel, whereby when the ball member received in said second socket member is detached therefrom and said first visor panel is swung into a rearwardly directed position along the left side of the vehicle the ball member on said second visor panel which is received in said fourth socket member can be detached therefrom and said second visor panel swung through approximately 180° so that it assumes a second generally planar relationship with said windshield with the ball member that has been detached from said fourth socket member then being in position to be received in said fifth socket member, or when the ball members on said first visor panel remain in said first and second socket members and the ball member on said second visor panel which is received in said fourth socket member is detached therefrom so said second visor panel can be swung into a centrally located position so that it assumes a generally perpendicular relationship with said windshield, or when the ball member on said second visor panel which is received in said third socket member is detached therefrom and said second visor panel is swung into a rearwardly directed position along the right side of the vehicle, the ball member on said first visor panel which is received in the first socket member can be detached therefrom and said first visor panel swung through approximately 180° so that it assumes a second generally planar relation with said windshield with the ball member that has been detached from said first socket member then being in position to be received in said sixth socket member, or when the ball members on said second visor panel remain in said third and fourth socket members and the ball member on said first visor panel which is received in said first socket member is detached therefrom said visor panel can be swung into a centrally located position so that it assumes a generally perpendicular relationship with said windshield.

39. In a vehicle having a windshield and body means extending peripherally thereof, a glare shield having shank means projecting from opposite ends thereof, first ball means on one projecting end of said shank means, second ball means on the other projecting end of said shank means, first socket means attached to said body means at a first location adjacent said windshield including a resilient O-ring for releasably retaining therein said first ball means, and secod socket means attached to said body portion at a second location adjacent said windshield including a resilient O-ring for releasably retaining therein said second ball means, said first and second socket means facing in the same general direction.

* * * * *